Patented Feb. 4, 1941

2,230,659

UNITED STATES PATENT OFFICE 2,230,659

PROCESS OF SYNTHESIZING ALPHA-TOCOPHEROL

Fritz von Werder, Darmstadt, Germany, assignor to Merck & Co., Inc., Rahway, N. J., a corporation of New Jersey No Drawing. Application August 28, 1939, Serial No. 292,318. In Germany September 28, 1938

1 Claim. (Cl. 260—333)

This invention relates to α-tocopherol and to processes for its production.

Certain processes for the production of α-tocopherol have been previously recorded in the literature. Thus, Karrer, Fritzsche, Ringier and Salomon (Helvetica Chimica Acta XXI, pages 520–524, 1938) have reported its production by condensation of trimethylhydroquinone and phytyl bromide in the presence of anhydrous zinc chloride. Subsequently, Karrer and Demole (Schweizerische medizinische Wochenschrift, vol. 68, page 956, 1938) stated that aluminum chloride may also be used as the condensing agent for the reaction. Further, Smith, Ungnade and Pritchard (Science, vol. 88, page 3738, 1938) have reported that α-tocopherol was prepared from trimethylhydroquinone with phytyl bromide or phytadiene without the addition of a condensing agent.

Bergel, Jacob, Todd and Work (Nature, vol. 142, page 26, 1938) have reported that tocopherol may be produced by heating trimethylhydroquinone and phytol in the presence of zinc chloride, but no details concerning this conversion have been reported.

A process for the production of tocopherol utilizing phytol itself as a reactant is desirable, but I have found that when trimethylhydroquinone is condensed with phytol in the presence of zinc chloride in accordance with the method mentioned by Bergel, Jacob, Todd and Work, a product is obtained which is deficient in vitamin-E activity in the animal test.

I have now found, however, that a highly active vitamin-E product may be produced by condensing trimethylhydroquinone and phytol if a specific condensing agent, namely phosphorous pentoxide is employed. A careful comparison of the product obtained by a synthesis carried out in the presence of anhydrous zinc chloride according to Bergel, et al., as above mentioned, and the product obtained by the new synthesis according to my present invention using phosphorous pentoxide as condensing agent, but otherwise identical reaction conditions being observed, proved that the crude condensation product prepared by the teachings of Bergel, et al., is ineffective in the animal test in a dosage of 3 mgs., whereas the product prepared according to the process of my invention overcomes resorption sterility of female rats in 67% of the cases when a single dose of 3 mgs. is administered.

An explanation for these differences cannot be definitely given at this time, but it is possible that the composition of the diastereomeric mixture formed in the condensation of trimethylhydroquinone and phytol is influenced by the condensing agent employed, and that the differences in therapeutic effectiveness result therefrom.

The following example is given to illustrate a preferred embodiment of my invention, but it will be understood that certain modifications and adaptations may be made therein without departing from the spirit of my invention and the scope of the appended claim.

Example

About 5 gms. of trimethylhydroquinone and 10 gms. of phytol are dissolved in 20 cm.$^3$ of absolute alcohol by gentle warming. This solution is added dropwise to about 10 gms. of phosphorous pentoxide while shaking and cooling, and is washed out with about 5 cm.$^3$ of absolute alcohol. Hydrogen is passed through and the entire mixture is stirred for about ½ hour at room temperature, and then stirred while warming on the glycerine bath. The bath temperature is increased to about 140°, during the course of about 2 hours, whereby about 5–8 cm.$^3$ of alcohol are distilled on the descending cooler. The mixture is stirred for about ¾ hour at 140°. After cooling, about 100 cm.$^3$ of water and 280 cm.$^3$ of 2% caustic soda solution are added dropwise with constant stirring. The oil separated is taken up in ether, the ether solution washed with about 5% caustic soda solution and water, dried, filtered and evaporated in vacuo to dryness. About 13.6 gms. of yellow oil are obtained as residue; its ultraviolet absorption spectrum shows a maximum of $$290 \text{ m}\mu (E_{1cm}^{1\%} = 65)$$

Administration of a single dose comprising 3 mgs. of this oil overcomes resorption sterility of female rats in 67% of the animals tested.

The oil may be further purified chromatographically. The allophanate, prepared in the usual manner, melts at about 170–171° C., its analytical values correspond to the formula $C_{31}H_{52}O_4N$, and for $(\alpha)_D$ in chloroform it has a value of −0.67°. The absorption spectrum of the allophanate is characterized by 2 maxima at $$284 \text{ m}\mu (E_{1cm}^{1\%} = 38)$$

and $$278 \text{ m}\mu (E_{1cm}^{1\%} = 35)$$

and a minimum at $$253 \text{ m}\mu (E_{1cm}^{1\%} = 6)$$

I claim:

Process for the production of alpha-tocopherol comprising condensing trimethylhydroquinone with phytol in the presence of phosphorous pentoxide.

FRITZ VON WERDER.